(12) United States Patent
Olofsson et al.

(10) Patent No.: US 12,529,664 B2
(45) Date of Patent: Jan. 20, 2026

(54) ANGLE-RESOLVING PHOTOELECTRON SPECTROMETER AND METHOD

(71) Applicant: Scienta Omicron AB, Uppsala (SE)

(72) Inventors: Mikael Olofsson, Uppsala (SE); Patrik Karlsson, Uppsala (SE)

(73) Assignee: Scienta Omicron AB, Uppsala (SE)

( * ) Notice: Subject to any disclaimer, the term of this patent is extended or adjusted under 35 U.S.C. 154(b) by 345 days.

(21) Appl. No.: 18/274,580

(22) PCT Filed: Jan. 19, 2022

(86) PCT No.: PCT/SE2022/050057
§ 371 (c)(1),
(2) Date: Jul. 27, 2023

(87) PCT Pub. No.: WO2022/164365
PCT Pub. Date: Aug. 4, 2022

(65) Prior Publication Data
US 2024/0110882 A1 Apr. 4, 2024

(30) Foreign Application Priority Data
Jan. 29, 2021 (SE) .................................... 2150106-9

(51) Int. Cl.
*G01N 23/2273* (2018.01)
*H01J 49/06* (2006.01)

(52) U.S. Cl.
CPC .......... *G01N 23/2273* (2013.01); *H01J 49/06* (2013.01)

(58) Field of Classification Search
CPC .............................. G01N 23/2273; H01J 49/06
See application file for complete search history.

(56) References Cited

U.S. PATENT DOCUMENTS 6,104,029 A 8/2000 Coxon et al.
6,444,981 B1 9/2002 Todokoro et al.
(Continued)

FOREIGN PATENT DOCUMENTS

CN 218036511 U 12/2022
EP 3032563 A1 6/2016
(Continued)

OTHER PUBLICATIONS

Extended European Search Report dated Jan. 3, 2025, directed to EP Application No. 22746346.0; 8 pages.
(Continued)

*Primary Examiner* — Sean M Luck
(74) *Attorney, Agent, or Firm* — Morrison & Foerster LLP (57) ABSTRACT

Described is an angle-resolving photoelectron spectrometer comprising an electrostatic lens system having a first end and a second end, and arranged to form a beam of electrons emitted from a measurement area on a sample surface, and to transport the electrons to the second end, wherein the first lens element is configured to be arranged at a positive voltage in relation to the sample. The spectrometer comprises at least a first shielding electrode with a limiting aperture, arranged such that the angle between the optical axis and any point on the limiting aperture is larger than 45° and smaller than 70, and at least one compensation electrode which is arranged around the optical axis at a larger distance from the measurement area than the first lens element. The compensation electrode is configured to be arranged at a negative voltage in relation to the sample.

17 Claims, 5 Drawing Sheets

(56) References Cited

U.S. PATENT DOCUMENTS

| | | | |
|---|---|---|---|
| 7,875,857 B2* | 1/2011 | Barnard ............. | G01N 23/2273 |
| | | | 378/138 |
| 2010/0001202 A1* | 1/2010 | Matsuda ................ | H01J 37/12 |
| | | | 250/311 |
| 2015/0028198 A1 | 1/2015 | Grinfeld et al. | |

FOREIGN PATENT DOCUMENTS

| | | |
|---|---|---|
| JP | 2001-35434 A | 2/2001 |
| JP | 2001-266786 A | 9/2001 |
| KR | 10-2020-0113166 A | 10/2020 |
| WO | 2008013232 A1 | 1/2008 |
| WO | 2019216348 A1 | 11/2019 |

OTHER PUBLICATIONS

Fang et al. (1996). "Design of a high-resolution angle-resolving photoelectron spectrometer system," Nuclear Instruments and Methods in Physics Research A 369: 322-327.

Yamane et al. (Sep. 3, 2019). "Acceptance-cone-tunable electron spectrometer for highly-efficient constant energy mapping," Review of Scientific Instruments 90(9): 093102-1-093102-7.

International Search Report and Written Opinion mailed Mar. 3, 2022, directed to International Application No. PCT/SE2022/050057; 13 pages.

Office Action and Search Report dated Oct. 25, 2021, directed to SE Application No. 2150106-9; 7 pages.

Xu et al. (Aug. 2019). "Advances in deep ultraviolet laser based high-resolution photoemission spectroscopy," Frontiers of Information Technology & Electronic Engineering, 20(7):885-913.

* cited by examiner

ANGLE-RESOLVING PHOTOELECTRON SPECTROMETER AND METHOD

CROSS-REFERENCE TO RELATED APPLICATIONS

This application is a U.S. national stage application under 35 U.S.C. § 371 of International Application No. PCT/SE2022/050057, filed Jan. 19, 2022, which claims the priority of Sweden Application No. 2150106-9, filed Jan. 29, 2021, the entire contents of each priority application of which is incorporated herein by reference.

FIELD OF THE DISCLOSURE

The present invention relates to an angle-resolving photoelectron spectrometer arranged to analyse electrons, emitted from a sample surface of a particle emitting solid sample, comprising a lens system having a first lens element, and being configured for arranging a positive voltage on the first lens element in relation to the sample surface in order to increase the emission angle from the sample surface for electrons which may enter the lens system. The invention also relates to a method for an angle-resolving photoelectron spectrometer.

BACKGROUND OF THE DISCLOSURE

The examination of the electronic properties of surfaces has been a research field for a long time. There are a number of different techniques available for the examination of the electronic properties of surfaces. Photoemission spectroscopy is a sensitive method in which electrons are emitted from a sample using photons. Electrons emitted in this way are called photoelectrons. The photoelectrons are emitted in all directions from the surface of the sample. Electrostatic lens systems are used to collect and focus the photoelectrons to an analyser. The photoelectrons enter the lens system through an aperture.

Photoelectrons are accepted into the lens system in an acceptance angle. The acceptance angle may be increased by increasing the size of the aperture and/or by decreasing the distance between the aperture and the sample. For different reasons it is not always desirable to increase the size of the aperture or to decrease the distance between the aperture and the sample. Another method for increasing the acceptance angle is to put a voltage between the sample and the lens to achieve an extraction field between the sample and the lens entrance, which extraction field accelerates the photoelectrons into the aperture of the electrostatic lens system. An electrostatic lens system with such an extraction field is usually called an immersion lens, since the sample is part of the lens system.

A problem with using an extraction field is that uneven or corrugated samples distort the trajectories of the electrons which prevents that an angularly resolved image of the sample is obtained. Furthermore, the surroundings of the sample will affect the electric field and distort the electron trajectories.

SUMMARY OF THE DISCLOSURE

An object of the present invention is to provide an angle-resolving photoelectron spectrometer, arranged to analyse electrons emitted from a sample surface of a solid sample, which spectrometer provides a large acceptance angle for the electrons while still keeping a near zero electric field at the sample surface and maintaining the integrity of the angular distribution.

Another object is to provide a method and an angle-resolving photoelectron spectrometer lens system, arranged to analyse electrons emitted from a sample surface of a solid sample, which method increases the acceptance angle for the electrons while still keeping a near zero electric field at the sample surface and maintaining the integrity of the angular distribution.

At least one of these objects is fulfilled with an angle-resolving photoelectron spectrometer and a method according to the independent claims.

Further advantages are provided with the features of the dependent claims.

According to a first aspect of the present invention an angle-resolving photoelectron spectrometer is provided which comprises an electrostatic lens system, having a first end and a second end, and comprising at the first end a first lens element having a lens aperture, which is to be arranged facing a sample surface of a solid sample. The angle-resolving photoelectron spectrometer comprises, at the second end, a measurement region for analysing the electrons. The electrostatic lens system comprises an optical axis extending through the lens aperture from the first end to the second end. The electrostatic lens system is arranged to form a beam of electrons emitted from a measurement area on the sample surface, and entering through the lens aperture. The electrostatic lens system is arranged to transport the electrons to the second end. The first lens element is configured to be arranged at a positive voltage in relation to the sample. The angle-resolving photoelectron spectrometer is characterized in that it comprises at least one shielding electrode with a limiting aperture. The shielding electrode is to be arranged between the sample and the first lens element, with the limiting aperture within a distance from the sample surface of no more than a fifth of the distance between the sample surface and the first lens element, with the limiting aperture surrounding the optical axis, wherein the size of the limiting aperture and the distance between the sample surface and the limiting aperture are such that the angle between the optical axis and a line between the sample surface at the optical axis and any point on the limiting aperture is larger than 45° and smaller than 70°. The angle-resolving photoelectron spectrometer comprises at least one compensation electrode, which is arranged around the optical axis at a larger distance from the measurement area than the first lens element. The compensation electrode is configured to be arranged at a negative voltage in relation to the sample.

Coulomb's law states that the field from a point charge in vacuum is proportional to the inverse square of the distance from the charge. In the simple naive case of having a point charge q at distance 1 and a charge −4q at distance 2 in the same direction from a point 0, the field at point 0 is 0. However, the field on the line between point 0 and the charge q is pointing away from charge q and increasing with smaller distance to charge q. This means that an electron placed between point 0 and charge q is accelerated towards q. Similar field distributions is what is achieved with the invention where the point 0 is the sample and the charge q is the lens entrance.

With an angle-resolving photoelectron spectrometer according to the first aspect of the invention it is possible to essentially cancel the electric field at the sample surface. In this way no electric field will affect the electrons when they are close to the surface where the electric field can be distorted by surface irregularities.

The voltage applied on the compensation electrode is preferably of such magnitude that a lower electric field is achieved at the measurement area on the sample surface in comparison to the electric field caused by the voltage on the first lens element. Preferably, the voltages are chosen such that electric field at the measurement area is less than 10%, preferably less than 5%, and most preferred less than 1% of the electric field at the measurement area when the compensation electrode is at the same potential as the sample surface. The voltage on the compensation electrode may be of such magnitude that the electric field at the measurement area fulfils one of these limits. It is preferred that the electric field at the measurement area is still positive so that no repulsion is experienced by the electrons. With a positive voltage the electrons are accelerated towards the lens, which results in a larger acceptance angle. The voltage of the compensation electrode, thus, also provides a lens effect which enables electrons with larger emission angles to enter the lens aperture.

The inventors have realized that electrons with very large emission angles from the sample surface contributes to a higher level of noise. The reason for this is partly because they enter the lens aperture at a too large angle. Thus, the lens effect of the compensation electrode will result in a higher level of noise. By introducing the at least one shielding electrode with a limiting aperture according to the first aspect the electrons with an emission angle above 70° are cut away. Since the setup is electrostatic it is scalable in size. To keep the size of the setup manageable it is preferable to have the limiting aperture close to the sample surface and within a fifth, preferably within a tenth, of the distance between the sample surface and the first lens element. This provides for electrons being efficiently cut away. This reduces the noise level.

The compensation electrode may be configured such that the electric potential is strictly increasing along the optical axis from the measurement area to the first lens element when said voltages are applied on the first lens element and the compensation electrode. Thus, in operation a lower electric field will affect electrons emitted from the sample surface. Also, as the electric potential is strictly increasing along the optical axis from the measurement area to the first lens element when voltages are applied on the first lens element and the compensation electrode even low energy particles may enter the lens aperture of the lens system.

The distance from the compensation electrode to the measurement area is preferably larger than the distance from the first lens element to the measurement area. In order to cancel the voltage, caused by the voltage on the first lens element, at the measurement area a higher voltage of opposite sign has to be applied on the compensation electrode in relation to the sample surface according to Coulomb's law, unless the area of the compensation electrode is larger than the area of the first lens element. If the area of the compensation electrode is much larger than the area of the first lens element, the magnitude of the voltage on the compensation electrode may be smaller than the magnitude of the voltage on the first lens element. As the distance to the first lens element is smaller the effect of the electric field from the first lens element will increase faster than the field from the compensation electrode. Thus, a strictly increasing potential is achieved when a voltage is applied on the compensation electrode which cancels the electric field at the measurement area.

The at least one compensation electrode may be arranged symmetrically around the optical axis. Such a symmetrical arrangement of the compensation electrode makes it easier to achieve a desired compensation of the electric field at the measurement area.

The emission of electrons from the sample surface is induced by electromagnetic radiation from a light source. It is favourable to provide the electromagnetic radiation towards the sample surface in an angle which is as steep as possible and focused on the sample surface. To obtain this the electromagnetic radiation beam needs to pass close to the outside of the first lens element. The compensation electrode may be arranged between the sample and the first lens element along the optical axis within a distance along the optical axis from the sample which is no more than half of the distance between the sample surface and the first lens element. By arranging the compensation element in this way it leaves room for the electromagnetic radiation to reach the sample. It also increases the distance between the element focussing the electromagnetic radiation and the compensation electrode, which in turn decreases the cross-talk between the element focussing the electromagnetic radiation and the compensation electrode.

The angle-resolving photoelectron spectrometer may be arranged such that the smallest distance between the compensation electrode and the optical axis is smaller than 2 times, preferably smaller than 1.5 times and most preferred smaller than 1 times the largest distance from the periphery of the lens system and the optical axis. In this way the overall dimensions of the angle-resolving photoelectron spectrometer is kept small.

The smallest distance between the compensation electrode and the optical axis may be larger than the largest distance between the edge of the lens aperture and the optical axis. In this way the risk that the compensation electrode limits the maximum angle at which particles may be emitted from the sample surface and still enter the lens aperture, is eliminated.

The angle-resolving photoelectron spectrometer may comprise at least one shielding electrode, which blocks the line of sight from the compensation electrode to the measurement area on the sample surface. With such an arrangement of a shielding electrode the effect of the electric field from the compensation electrode may be controlled also by the geometric shapes and positions of the compensation electrode, the shielding electrode and the sample. This also results in that the magnitude of the voltage on the compensation electrode may be lower than the magnitude of the voltage on the first lens element while enabling cancellation of the electric field at the measurement area.

The angle-resolving photoelectron spectrometer may comprise at least two compensation electrodes, wherein the compensation electrodes are configured to be applied with different voltages, to enable movement of the position of the maximum electric field caused by the compensation electrodes. Preferably, when the angle-resolving photoelectron spectrometer comprises more than one compensation electrode the number of compensation electrodes is four. Two of the compensation electrodes may be used to move the position of minimum electric field in a first direction on the sample surface while the other two electrodes may be used to move the position of minimum electric field in a second direction on the sample surface, wherein the second direction is perpendicular to the first direction.

The angle-resolving photoelectron spectrometer may comprise at least one correction electrode, which is arranged symmetrically around the optical axis, comprising a correction edge arranged between the lens aperture and the sample surface along the optical axis, wherein the correction edge defines an opening allowing electrons to pass the correction electrode, and wherein every point on the correction edge is at a larger distance from the optical axis than every point on the lens aperture edge.

The angle-resolving photoelectron spectrometer may be configured for application of a higher positive voltage on the correction electrode than on the first lens element. The main function of the correction electrode is to attract electrons which are emitted from the measurement area at a large angle to the optical axis. In this way said electrons are prevented from entering through the lens aperture. Said electrons do not reach the second end of the lens element due to their angle. Thus the noise is reduced by the correction electrode.

According to a second aspect of the present invention a method is provided for an angle-resolving photoelectron spectrometer, comprising an electrostatic lens system having a first end and a second end, and comprising at the first end, a first lens element having a lens aperture, which is to be arranged facing a sample surface of a solid sample, and at the second end, a measurement region for analysing the electrons. The electrostatic lens system comprises an optical axis extending through the lens aperture from the first end to the second end. The electrostatic lens system is arranged to form a beam of electrons emitted from a measurement area on the sample surface, and entering through the lens aperture. The electrostatic lens system is arranged to transport the electrons to the second end. The method comprises the step of applying, on the first lens element, a positive voltage in relation to the particle emitting sample. The method is characterized in that the method comprises the step of providing at least one shielding electrode with a limiting aperture, between the sample and the first lens element, with the limiting aperture within a distance from the sample surface of no more than a fifth of the distance between the sample surface and the first lens element, with the limiting aperture surrounding the optical axis. The size of the limiting aperture and the distance between the sample surface and the limiting aperture are such that the angle between the optical axis and a line between the sample surface at the optical axis and any point on the limiting aperture is larger than 45° and smaller than 70°. The method is also characterized in that it comprises the steps of providing at least one compensation electrode which is arranged around the optical axis, and arranging the compensation electrode at a negative voltage in relation to the particle emitting sample, to achieve a lower electric field at the measurement area on the sample surface in comparison to the electric field caused by the voltage on the first lens element.

With a method according to the second aspect of the invention it is possible to essentially cancel the electric field at the sample surface. In this way no electric field will affect the electrons when they are close to the surface where the electric field can be distorted by surface irregularities.

The voltage applied on the compensation electrode is preferably of such magnitude that a lower electric field is achieved at the measurement area on the sample surface in comparison to the electric field caused by the voltage on the first lens element. In a setup according to the prior art the compensation electrode is at the same potential as the sample surface and a voltage is applied on the first lens element. This will result in an electric field at the measurement area, Preferably, according to a preferred embodiment the voltage applied on the compensation electrode is chosen such that electric field at the measurement area is less than 10%, preferably less than 5%, and most preferred less than 1% of the electric field at the measurement area when the compensation electrode is at the same potential as the sample surface and with the same voltage applied on the first lens element as in the first example. The voltage on the compensation electrode may be of such magnitude that the electric field at the measurement area fulfils one of said limits. It is preferred that the electric field at the measurement area is still positive so that no repulsion is experienced by the electrons. The voltage of the compensation electrode also provides a lens effect which enables electrons with larger emission angles to enter the lens aperture.

The inventors have realized that electrons with very large emission angles from the sample surface contributes to a higher level of noise. The reason for this is partly because they enter the lens aperture at a too large angle. Thus, the lens effect of the compensation electrode will result in a higher level of noise. By introducing the at least one shielding electrode with a limiting aperture according to the first aspect the electrons with an emission angle above 70° are cut away. Since the setup is electrostatic it is scalable in size. To keep the size of the setup manageable it is preferable to have the limiting aperture close to the sample surface and within a fifth, preferably within a tenth, of the distance between the sample surface and the first lens element. This provides for electrons being efficiently cut away. This reduces the noise level.

The electrode may be configured such that the electric potential is strictly increasing along the optical axis from the measurement area to the first lens element when said voltages are applied on the first lens element and the compensation electrode. Thus, a lower electric field will affect the emission of electrons from the sample surface. Also, as the electric potential is strictly increasing along the optical axis from the measurement area to the first lens element when voltages are applied on the first lens element and the compensation electrode even low energy particles may enter the lens aperture of the lens system.

The negative voltage on the compensation electrode may have a larger magnitude than the positive voltage on the first lens element. With such voltages the electric field at the sample surface may be completely cancelled in one point.

The method may comprise the step of providing at least one shielding electrode which partly shields the compensation electrode electrically from the measurement area on the sample surface. With such an arrangement of a shielding electrode the effect of the electric field from the compensation electrode may be controlled also by the geometric shapes and positions of the compensation electrode, the shielding electrode and the sample. This also results in that the voltage on the compensation electrode may be lower than the voltage on the first lens element while enabling cancellation of the electric field at the measurement area.

The method may comprise providing at least two compensation electrodes, wherein voltages applied to the compensation electrodes are changed to move the position of the minimum electric field on the sample surface generated by all electrodes.

The method may comprise the step of providing a correction electrode which is arranged symmetrically around the optical axis, comprising a correction edge arranged between the lens aperture and the sample surface along the optical axis. The correction edge defines an opening allowing electrons to pass the correction electrode, wherein every point on the edge is at a larger distance from the optical axis than every point on the lens aperture edge.

A higher positive voltage may be applied on the correction electrode than on the first lens element. The main function of the correction electrode is to attract electrons which are emitted from the measurement area at a large angle to the optical axis. In this way said electrons are prevented from entering through the lens aperture. Said electrons do not reach the second end of the lens element due to their angle. Thus the noise is reduced by the correction electrode.

With a higher positive voltage applied on the correction electrode the electric potential will not be strictly increasing along the optical axis from the measurement area to the first lens element.

In the following preferred embodiments of the invention will be described with reference to the drawings.

DETAILED DESCRIPTION OF THE DISCLOSURE

The invention is described in the following illustrative and non-limiting detailed description of exemplary embodiments, with reference to the appended drawings. In the drawings, similar features in different drawings are denoted by the same reference numerals. The drawings are not drawn to scale.

Figure 1A:
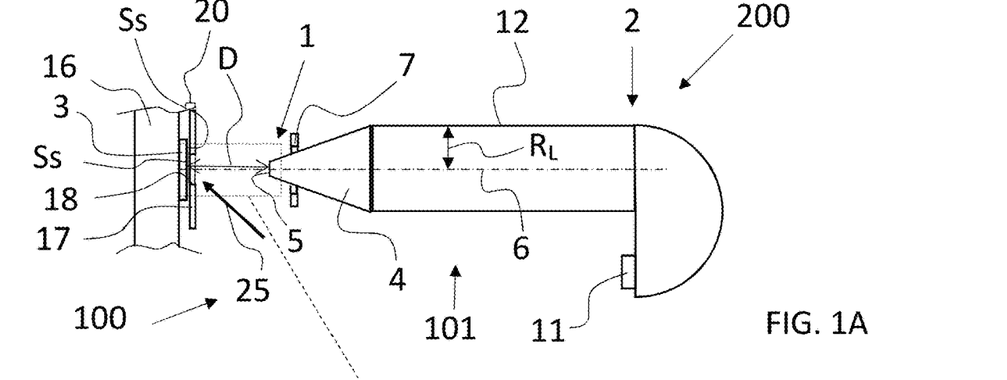
FIG. 1A shows schematically an angle-resolving photoelectron spectrometer according to an embodiment of the invention.
Figure 1B:
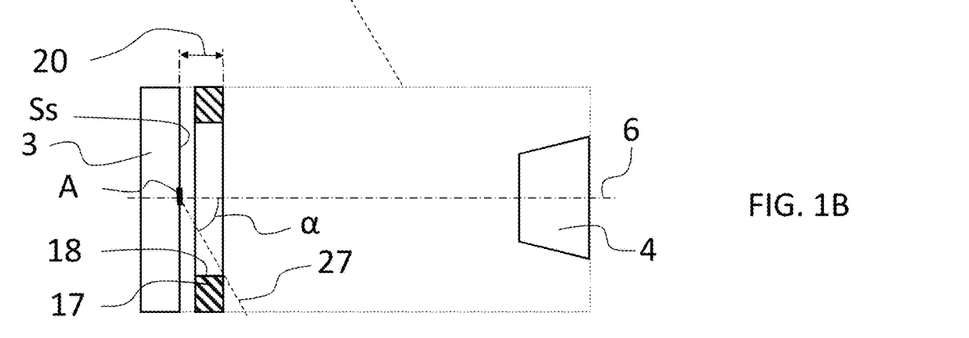
FIG. 1B is an enlargement of a part of FIG. 1A.

FIG. 1A shows schematically an angle-resolving photoelectron spectrometer 100 according to an embodiment of the invention. FIG. 1B is an enlargement of a part of FIG. 1A. The angle-resolving photoelectron spectrometer 100 comprises an electrostatic lens system 101 with a first end 1, and a second end 2 at a distance from the first end 1. A particle emitting solid sample 3 is arranged on a manipulator 16. The particle emitting sample 3 is arranged with its sample surface Ss facing the first end 1 of the electrostatic lens system 101. The electrostatic lens system 101 comprises a first lens element 4 with a lens aperture 5 and additional lens elements 12. An optical axis 6 extends through the lens aperture 5 from the first end 1 to the second end 2. The electrostatic lens system 101 also comprises a compensation electrode 7 which is arranged symmetrically around the optical axis 6. The compensation electrode 7 is configured to be arranged at a voltage in relation to the particle emitting sample Ss to decrease the electric field at the measurement area A on the sample surface Ss, in comparison to the electric field caused by a voltage on the first lens element 4. In FIG. 1B the measurement area is marked with a thicker line. The measurement area is the area from which electrons are emitted. The angle-resolving photoelectron spectrometer 100 comprises a shielding electrode 17 with a limiting aperture 18. The shielding electrode 17 could be split in two or more parts. The shielding electrode 17 is arranged between the sample 3 and the first lens element 4, with the limiting aperture 18 within a distance 20 from the sample surface Ss of no more than a fifth of the distance D between the sample surface Ss and the first lens element 4, with the limiting aperture 18 surrounding the optical axis 6. The shielding electrode 17 may extend beyond said fifth of the distance D between the sample surface Ss and the first lens element 4, as long as the aperture is within said fifth of the distance D between the sample surface Ss and the first lens element 4. As is shown in FIG. 1B, the size of the limiting aperture 18 and the distance 20 between the sample surface and the limiting aperture 18 are such that the angle α between the optical axis 6 and a line 27 between the sample surface Ss at the optical axis 6 and any point on the limiting aperture 18 is larger than 45° and smaller than 70°, preferably smaller than 60°. In FIG. 1B the angle α is about 60°. In FIG. 1B the measurement area A is shown as the thicker line on the sample surface Ss. The sample 3 is arranged such that the distance between the sample surface Ss and the limiting aperture 18 is independent of the sample 3. Particles may be caused to be emitted from the sample surface Ss by electromagnetic radiation 25, which might be visible, or ultraviolet light or X-rays. The electrostatic lens system 101 is arranged to form a beam of electrons, emitted from a measurement area A on the sample surface Ss of the particle emitting sample 3, which enter the lens system through the lens aperture 5 at the first end 1 and to transport the electrons to the second end 2. After having reached the second end the particles passes an entrance 21 into a measurement region 22 and are analysed by an analyser device 11, which might be, e.g., an electrostatic hemisphere or a time-of-flight analyser. The analyser is not part of the lens system 101. The lens system 101 comprises at the first end 1, a first lens element 4 having a lens aperture 5, which is to be arranged facing the sample surface Ss, for allowing at least a part of said particles to enter the lens system 101. The number of particles which enter through the lens aperture 5 is determined by the size of the lens aperture 5 and the emission angles of the particles from the particle emitting sample 3. Without any electric field applied between the first lens element 4 and the particle emitting sample the solid angle of the lens aperture 5 seen from the measurement area determines the emission angle for the particles entering through the lens aperture 5. To increase the emission angle of the particles which enter through the lens aperture 5 the first lens element 4 is configured to be arranged at a voltage in relation to the sample surface Ss, which attracts the particles from the sample surface Ss. By applying such a positive voltage to the first lens element 4 the particles emitted from the measurement area A will be accelerated towards the first lens element 4. This will result in that particles with a larger emission angle will enter the lens aperture 5.

The compensation electrode 7 is configured such that the electric potential is strictly increasing along the optical axis 6 from the measurement area A to the first lens element 4 when said voltages are applied on the first lens element 4 and the compensation electrode 7.

Apart from the first lens element 4, the electrostatic lens element 101 comprises additional lens elements 12. The additional lens elements will not be described in detail in this application as the focus of this application is on the field between the sample surface Ss and the first lens element 4.

The function of the electric fields will be described in more detail in relation to FIGS. 2 and 3. The voltage on the first lens element 4 should be positive to attract the electrons. The electric field on the compensation electrode 7 should be negative to compensate for the electric field at the sample 3 caused by the positive electric field on the first lens element 4.

Figure 2:
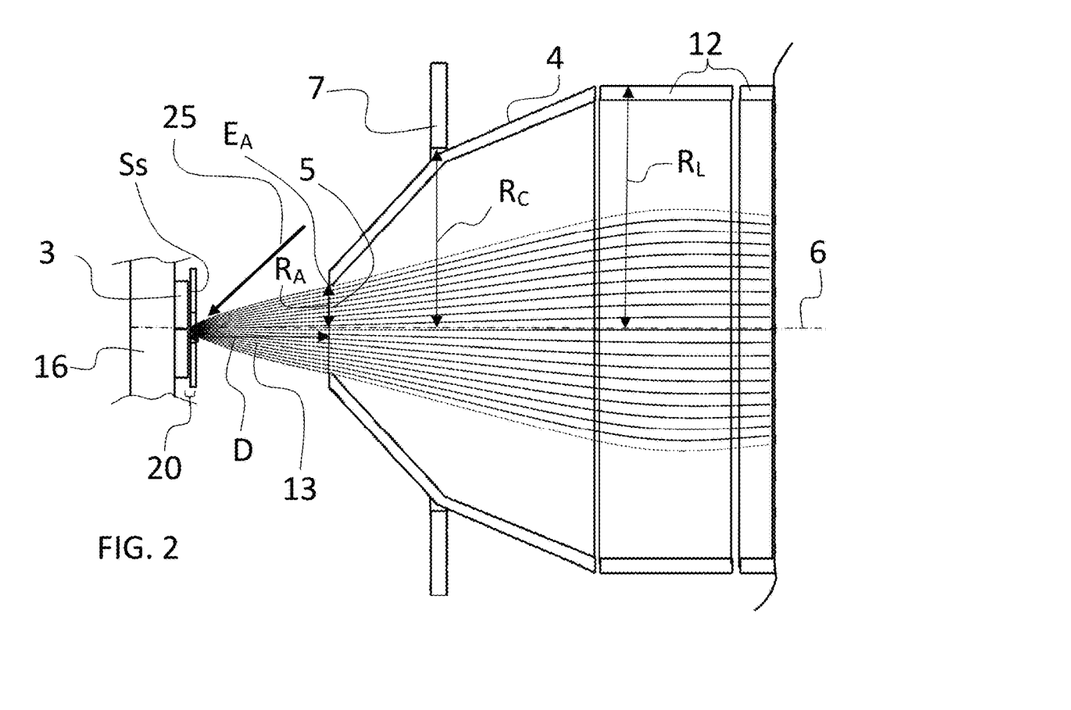
FIG. 2 shows in cross section a part of the spectrometer shown in FIG. 1A, with electron trajectories resulting from electric fields according to a first setting.

FIG. 2 shows in cross section a part of the angle-resolving photoelectron spectrometer 100 shown in FIGS. 1A and 1B, with electron trajectories 13 resulting from electric fields according to a first setting. The additional lens elements are denoted 12. In the embodiment shown in FIG. 2 the kinetic energy of the electrons is 10 eV and a positive voltage of 200 V is applied to the first lens element 4 in relation to the sample surface Ss. This positive voltage results in strongly curved electron trajectories in proximity to the sample surface Ss. This results in that electrons emitted from the sample surface Ss in an angle within +/−45 degrees from the optical axis 6 enter through the lens aperture 5 compared to only +/−15 degrees without any positive electric field. No voltage is applied to the compensation electrode 7. The electric field 0.2 mm from the sample surface Ss is in this case 8200 V/m.

Figure 3:
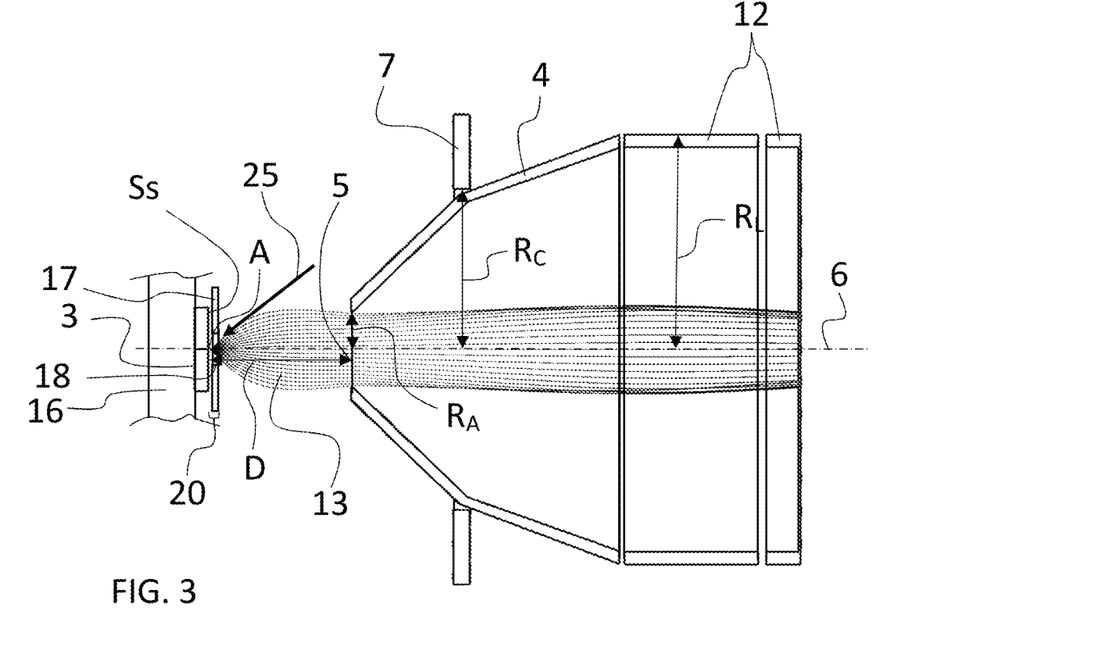
FIG. 3 shows in cross section the part of the spectrometer shown in FIG. 2, with electron trajectories resulting from electric fields according to a second setting.

FIG. 3 shows in cross section a part of the angle-resolving photoelectron spectrometer 100 shown in FIGS. 1A and 1B, with electron trajectories 13 resulting from electric fields according to a second setting. In the embodiment shown in FIG. 2 a positive voltage of 200 V is applied to the first lens element 4 in relation to the sample surface Ss. A negative voltage of −386 V is applied to the compensation electrode 7. These electric fields result in an electric field of 0.3 V/m 0.2 mm from the surface which is considerably lower than with the electric fields according to the first setting. In case the kinetic energy of the electrons is 100 eV the same trajectories are achieved if the voltages are increased by a factor of 10. Thus, the combination of the negative electric field from the compensation electrode and the positive electric field from the first lens element results in less strongly curved electron trajectories in proximity to the sample surface Ss in comparison to the electric fields according to the first setting. However, when the electrons travels towards the first lens element the combined electric field from the compensation electrode 7 and the first lens element 4 will make the electron trajectories bend. This results in that electrons emitted from the sample surface Ss in an angle within +/−45 degrees from the optical axis 6 enter through the lens aperture 5 with usable trajectories, i.e., the electrons emitted from the sample surface Ss in an angle within +/−45 degrees from the optical axis 6 will be transported to the second end 2 of the lens system 101 (FIGS. 1A and 1B).

As can be seen in FIGS. 2 and 3 the compensation electrode 7 is arranged on the same side of the sample surface Ss as the first lens element 4. The distance $R_C$ from the compensation electrode to the optical axis 6 is larger than the distance $R_A$ between the first lens element and the optical axis. Also the compensation electrode 7 is arranged at a larger distance, along the optical axis 6, from the sample surface Ss than the first lens element. This results in a considerably larger distance from the compensation electrode 7 to the measurement area A. In order for the electric field from the compensation electrode to be able to cancel the electric field from the first lens element 4 the negative voltage on the compensation electrode 7 has to be considerably higher than the positive voltage on the first lens element 4.

Figure 4:
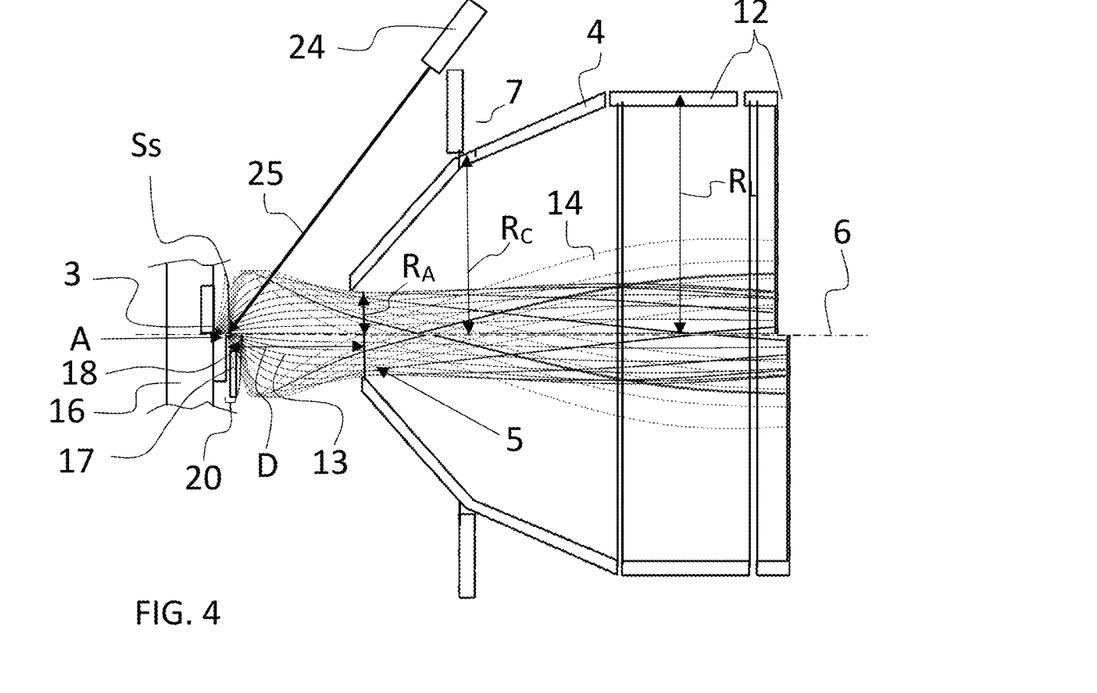
FIG. 4 shows in cross section the part of the spectrometer shown in FIG. 2, with electron trajectories resulting from electric fields according to the second setting.

FIG. 4 shows in cross section the part of the angle-resolving photoelectron spectrometer 100 shown in FIG. 3, with electron trajectories 13 resulting from electric fields according to the second setting. FIG. 4 shows the electron trajectories also for electron having a larger emission angle, in relation to the optical axis 6, than 45 degrees. As can be seen in FIG. 4, some of the electron trajectories at large emission angles will enter the lens aperture 5. These electron trajectories 14 will have too large deviation for proper handling by the lens system 101. Typically some of them will be transported to the second end 2 at a back-folded mapping. Such electrons would result in noise in the signal in an analyser 11 at the second end 2 of the lens system 101. In FIG. 4 only half the shielding electrode 17 is shown to illustrate the blocking of the electrons with large emission angles. In the embodiment in FIG. 4 the focusing element 24 focusing the electromagnetic radiation 25 on the measurement area A is also shown. Depending on the wavelength and the choice of implementation the focusing element may be a capillary for x-rays, an optical fibre, a lens or a mirror.

Figure 5:
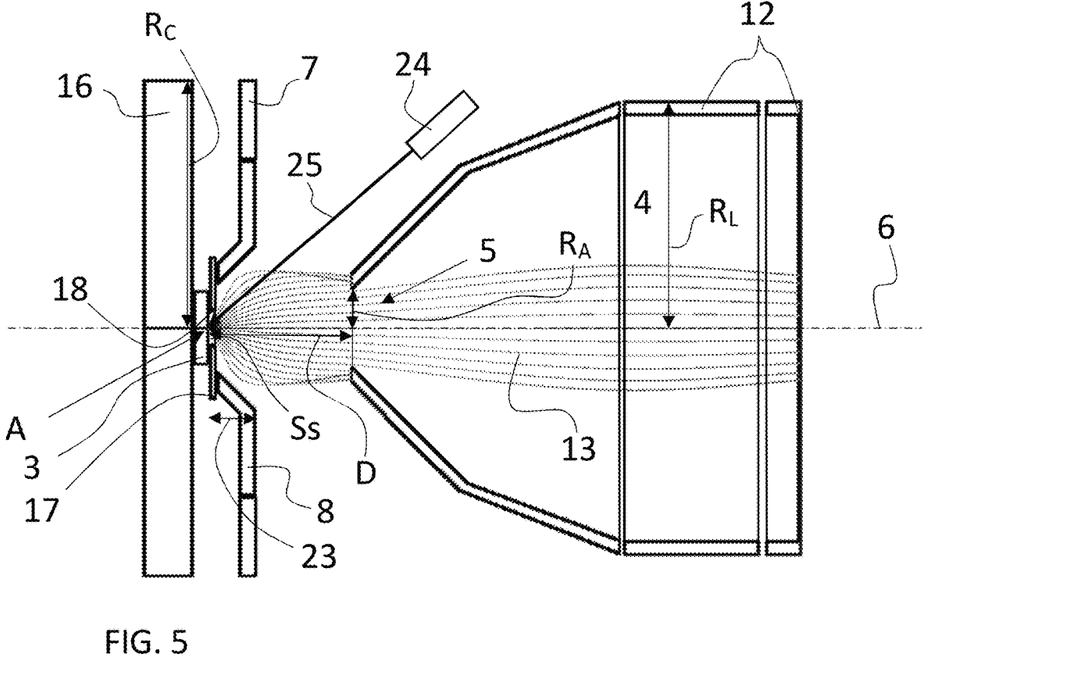
FIG. 5 shows in cross section a part of a spectrometer according to a different embodiment, with electron trajectories resulting from electric fields according to a third setting.

FIG. 5 shows in cross section a part of an angle-resolving photoelectron spectrometer 100 according to a different embodiment, with electron trajectories resulting from electric fields according to a third setting. In the embodiment shown in FIG. 5 the compensation electrode 7 is arranged between the sample 3 and the first lens element 4 along the optical axis 6 within a distance 23 from the sample 3 which is no more than half of the distance D, along the length axis 6, between the sample surface Ss and the first lens element 4. The part of the angle-resolving photoelectron spectrometer 100 shown in FIG. 5 comprises a second shielding electrode 8, which blocks the line of sight from the compensation electrode 7 to the measurement area A on the sample surface Ss. The second shielding electrode 8 provides for additional electrons being cut off apart from those already cut off with the shielding electrode 17. In the embodiment shown in FIG. 5 the kinetic energy of the electrons is 10 eV and a voltage of −2.1 V is applied on the second shielding electrode. The function of the voltage on the second shielding electrode 8 is to repel electrons from the second shielding electrode 8. The compensation electrode provides acceleration perpendicular to the optical axis 6 as well as along the optical axis 6. The shielding electrode also absorbs electrons which are emitted from the measurement area at a large angle to the optical axis 6. A voltage of −30 V is applied to the compensation electrode and a voltage of +80 V is applied to the first lens element 4. As can be seen in FIG. 5 electrons which are emitted from the measurement area at a large angle to the optical axis 6 are absorbed by the first shielding electrode 17 and does not enter through the lens aperture 5. In the embodiment in FIG. 6 the focusing element 24 focusing the electromagnetic radiation 25 on the measurement area A is also shown.

Figure 6:
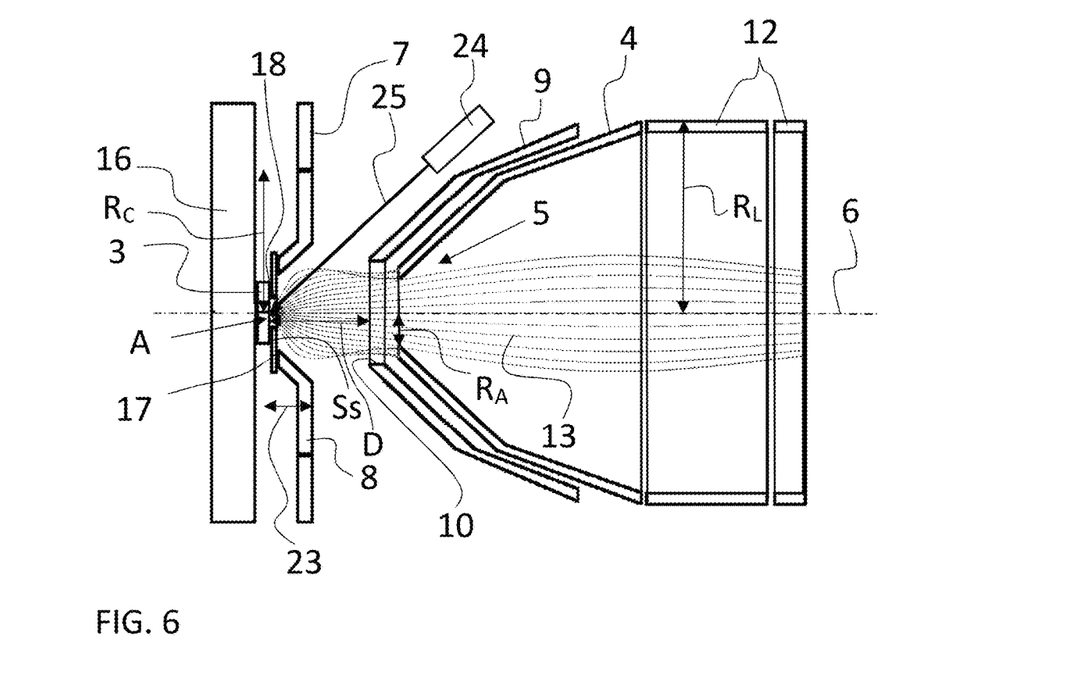
FIG. 6 shows in cross section a part of a spectrometer according to a different embodiment, with electron trajectories resulting from electric fields according to a fourth setting.

FIG. 6 shows in cross section a part of an angle-resolving photoelectron spectrometer 100 according to a different embodiment, with electron trajectories resulting from electric fields according to a fourth setting. In the embodiment shown in FIG. 6 the shielding electrode 8 has the shape of a truncated cone close to the sample 3. In the embodiment in FIG. 6 the focusing element 24 focusing the electromagnetic radiation 25 on the measurement area A is also shown. As can be seen in FIG. 6 the arrangement of the compensation electrode 7 closer to the sample than to the first lens element 4 results in that the focusing element 24 focusing the electromagnetic radiation 25 may be arranged at a distance from the compensation electrode, which is favourable from an electrostatical point of view. Also, the focusing element may be arranged closer to the first lens element 4 compared to the embodiment in FIG. 4. This results in the electromagnetic radiation 25 being incident on the sample surface Ss 3 in a steeper angle, which in turn results in a smaller spot of electromagnetic radiation 25 on the sample surface Ss.

The part of the angle-resolving photoelectron spectrometer 100 shown in FIG. 6 comprises a correction electrode 9, which is arranged symmetrically around the optical axis 6, comprising a correction edge 10 arranged between the lens aperture 5 and the sample surface Ss along the optical axis 6. The lens aperture 5 is defined by a lens aperture edge EA. The correction edge 10 defines an opening allowing electrons to pass the correction electrode 9. Every point of the correction edge 10 is at a larger distance from the optical axis 6 than the lens aperture edge EA.

In the embodiment of FIG. 6 the kinetic energy of the electrons is 10 eV, a voltage of +100 V is applied to the first lens element, a voltage of +104 V is applied to the correction electrode 9, a voltage of −9 V is applies to the shielding electrode 8, and a voltage of −1000 V is applied to the compensation electrode 7. The main function of the correction electrode is to attract electrons which are emitted from the measurement area at a large angle to the optical axis 6. In this way said electrons are prevented from entering through the lens aperture 5. In this way the noise is reduced.

Figure 7:
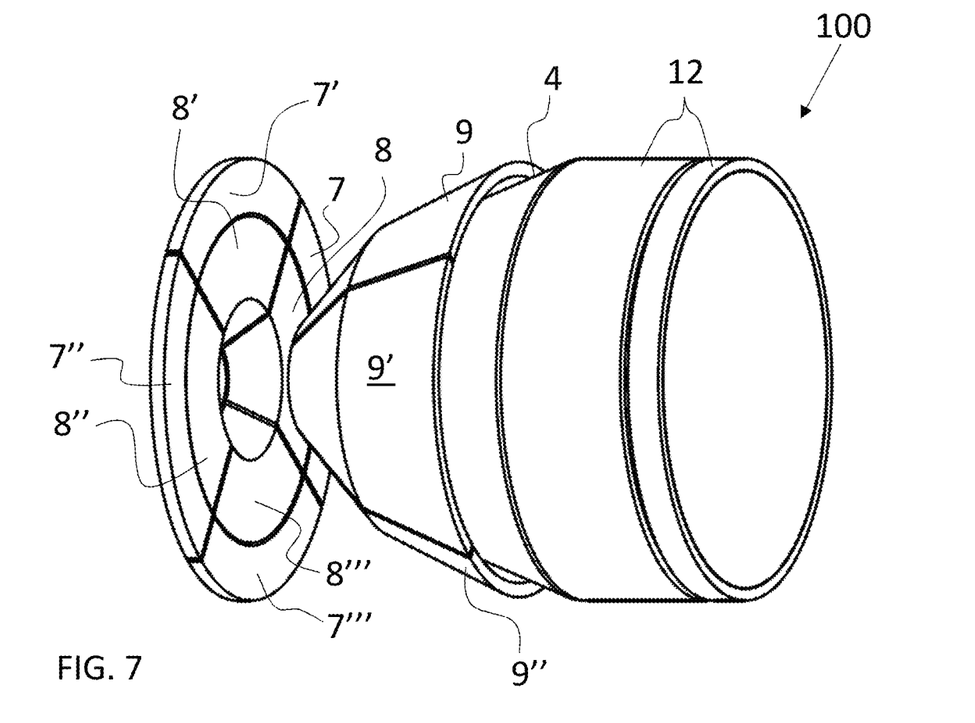
FIG. 7 shows in a perspective view a part of a spectrometer according to a different embodiment.

FIG. 7 shows in a perspective view a part of an angle-resolving photoelectron spectrometer 100 according to a different embodiment. The part of the angle-resolving photoelectron spectrometer 100 according to the embodiment of FIG. 7 has four compensation electrodes 7, 7', 7", 7''', and four corresponding second shielding electrodes 8, 8', 8", 8'''. The part of the angle-resolving photoelectron spectrometer 100 shown in FIG. 7 also comprises four correction electrodes 9, 9', 9", of which only three are shown in FIG. 7. In operation different voltages may be applied to the different compensation electrodes 7, 7', 7", 7''', to move the point of lowest electric field across the sample surface. When the same voltage is applied to all compensation electrodes 7, 7', 7", 7''', the point of lowest electric field is at the optical axis.

Figure 8:
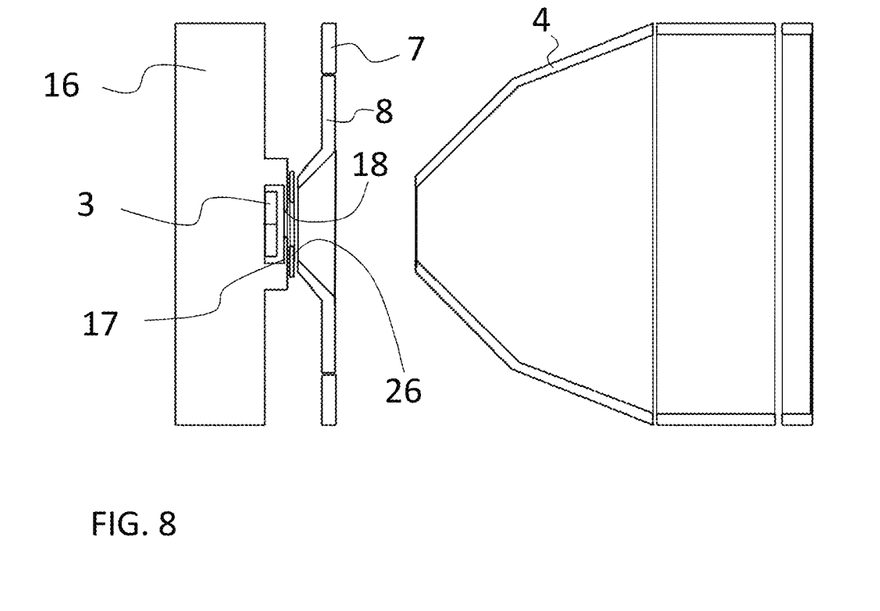
FIG. 8 shows in cross section a part of an angle-resolving photoelectron spectrometer according to a different embodiment.

FIG. 8 shows in cross section a part of an angle-resolving photoelectron spectrometer 100 according to a different embodiment. The angle-resolving photoelectron spectrometer 100 in FIG. 8 is similar to the one shown in FIG. 5. The main difference between the embodiment of FIG. 8 and the embodiment of FIG. 5 is that the photoelectron spectrometer 100 of FIG. 8 comprises a third shielding electrode 26, which in the embodiment is similar to the first shielding electrode in FIG. 8. The third shielding electrode 26 is arranged between the first shielding electrode 17 and the second shielding electrode 8. A manipulator lid constitutes first shielding electrode 17 in FIG. 8. It would be possible to change place on the shielding electrodes and to have the first shielding electrode 17 with the limiting aperture 18 at a different position. It is, however, favourable to have the limiting aperture 18 as close to the sample as possible as such an arrangement will shield the sample efficiently from the surrounding environment.

Figure 9:
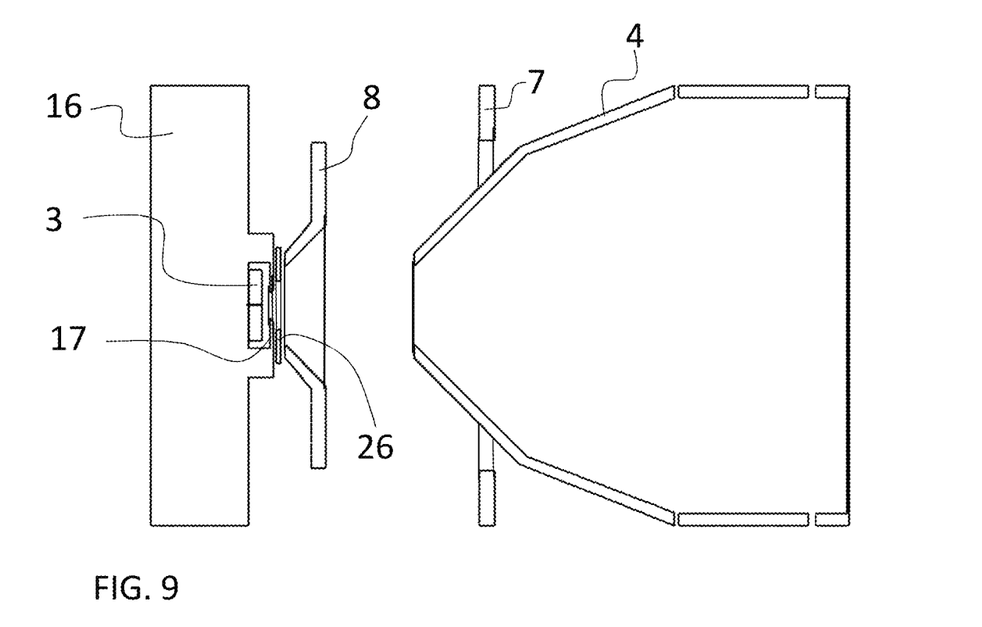
FIG. 9 shows in cross section a part of an angle-resolving photoelectron spectrometer according to a different embodiment.

FIG. 9 shows in cross section a part of an angle-resolving photoelectron spectrometer 100 according to a different embodiment. The only difference in comparison to FIG. 8 is that the compensation electrode 7 is moved to be downstream the lens aperture 5, i.e. as in FIGS. 2-4.

Figure 10:
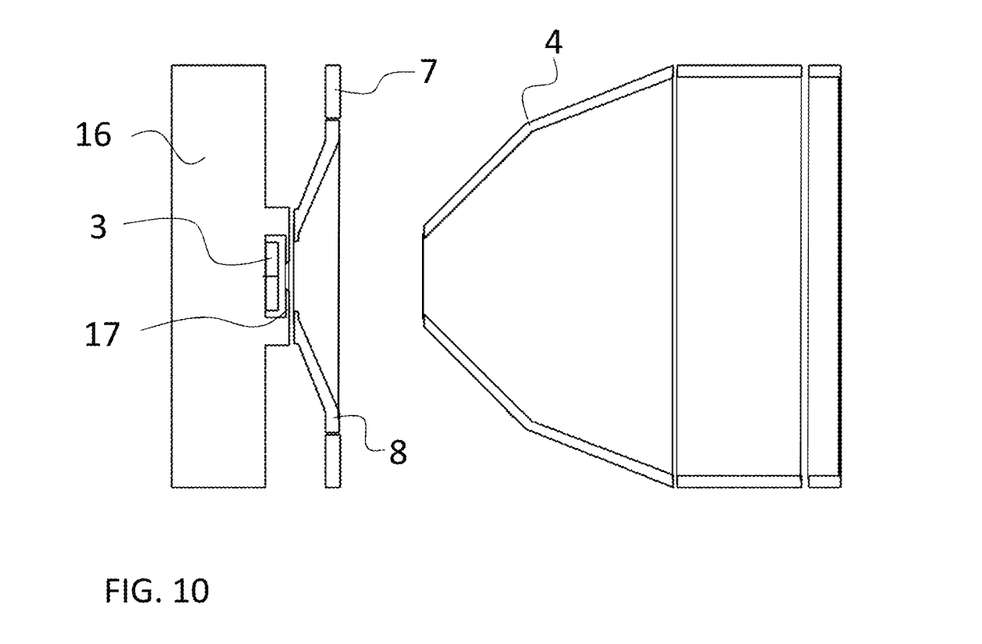
FIG. 10 shows in cross section a part of an angle-resolving photoelectron spectrometer according to a different embodiment.

FIG. 10 shows in cross section a part of an angle-resolving photoelectron spectrometer 100 according to a different embodiment. The embodiment of FIG. 10 is similar to the embodiment shown in FIG. 5 with the only difference that the first shielding electrode 17 is constituted by a manipulator lid.

The above described embodiments may be altered in many ways without departing from the scope of the invention which is limited only by means of the appended claims and their limitations.

The invention claimed is:

1. An angle-resolving photoelectron spectrometer comprising an electrostatic lens system having a first end and a second end, and comprising at the first end, a first lens element having a lens aperture, which is to be arranged facing a sample surface of a solid sample, at the second end, a measurement region 22 for analysing the electrons, wherein the electrostatic lens system comprises an optical axis extending through the lens aperture from the first end to the second end, wherein the electrostatic lens system is arranged to form a beam of electrons emitted from a measurement area on the sample surface, and entering through the lens aperture, wherein the electrostatic lens system is arranged to transport the electrons to the second end, and wherein the first lens element is configured to be arranged at a positive voltage in relation to the sample, characterized in that it comprises at least a first shielding electrode with a limiting aperture, which shielding electrode is to be arranged between the sample and the first lens element, with the limiting aperture within a distance from the sample surface of no more than a fifth of the distance between the sample surface and the first lens element, with the limiting aperture surrounding the optical axis, wherein the size of the limiting aperture and the distance between the sample surface and the limiting aperture are such that the angle between the optical axis and a line between the sample surface at the optical axis and any point on the limiting aperture is larger than 45° and smaller than 70°, and at least one compensation electrode which is arranged around the optical axis at a larger distance from the measurement area than the first lens element, wherein the compensation electrode is configured to be arranged at a negative voltage in relation to the sample.

2. The spectrometer according to claim 1, wherein the compensation electrode is configured such that the electric potential is strictly increasing along the optical axis from the measurement area to the first lens element when said voltages are applied on the first lens element and the compensation electrode.

3. The spectrometer according to claim 1, wherein the at least one compensation electrode is arranged symmetrically around the optical axis.

4. The spectrometer according to claim 1, wherein the compensation electrode is arranged between the sample and the first lens element along the optical axis within a distance along the optical axis from the sample which is no more than half of the distance between the sample surface and the first lens element.

5. The spectrometer according to claim 1, wherein the smallest distance between the compensation electrode and the optical axis is smaller than 2 times, preferably smaller than 1.5 times and most preferred smaller than 1 times the largest distance from the periphery of the lens system and the optical axis.

6. The spectrometer according to claim 1, wherein the smallest distance between the compensation electrode and the optical axis is larger than the largest distance between the edge of the lens aperture and the optical axis.

7. The spectrometer according to claim 1, comprising a second shielding electrode which blocks the line of sight from the compensation electrode to the measurement area on the sample surface.

8. The spectrometer according to claim 1, wherein the spectrometer comprises at least two compensation electrodes, wherein the compensation electrodes are configured to be applied with different voltages, to enable movement of the position of the minimum electric field on the sample surface generated by all electrodes.

9. The spectrometer according to claim 1, wherein the lens system comprises at least one correction electrode which is arranged symmetrically around the optical axis, comprising an correction edge arranged between the lens aperture and the sample surface along the optical axis, wherein the correction edge defines an opening allowing electrons to pass the correction electrode, and wherein every point on the correction edge is at a larger distance from the optical axis than every point on the lens aperture edge.

10. A method for an angle-resolving photoelectron spectrometer comprising:
    an electrostatic lens system having a first end and a second end, and comprising at the first end, a first lens element having a lens aperture, which is to be arranged facing a sample surface of a solid sample, and
    at the second end, a measurement region for analysing the electrons,
wherein the electrostatic lens system comprises an optical axis extending through the lens aperture from the first end to the second end,
wherein the electrostatic lens system is arranged to form a beam of electrons emitted from a measurement area on the sample surface, and entering through the lens aperture,
wherein the electrostatic lens system is arranged to transport the electrons to the second end, and
wherein the method comprises the step of
    applying, on the first lens element, a positive voltage in relation to the sample,
characterized in that the method comprises the steps of
    providing at least a first shielding electrode with a limiting aperture, between the sample and the first lens element, with the limiting aperture within a distance from the sample surface of no more than a fifth of the distance between the sample surface and the first lens element, with the limiting aperture surrounding the optical axis, wherein the size of the limiting aperture and the distance between the sample surface and the limiting aperture are such that the angle between the optical axis and any point on the limiting aperture is larger than 45° and smaller than 70°, seen from a point on the sample surface at the optical axis, and
    providing at least one compensation electrode which is arranged around the optical axis, and
    arranging the compensation electrode at a negative voltage in relation to the particle emitting sample, to achieve a lower electric field at the measurement area on the sample surface in comparison to the electric field caused by the voltage on the first lens element.

11. The method according to claim 10, wherein the compensation electrode is configured such that the electric potential is strictly increasing along the optical axis from the measurement area to the first lens element, when said voltages are applied on the first lens element and the compensation electrode.

12. The method according to claim 10, wherein the negative voltage on the compensation electrode has a larger magnitude than the positive voltage on the first lens element.

13. The method according to claim 10, wherein the voltage on the compensation electrode 7 is of such magnitude that the electric field at the measurement area is less than 10%, preferably less than 5%, and most preferred less than 1% of the electric field at the measurement area when the compensation electrode is at the same potential as the sample surface.

14. The method according to claim 10, comprising the step of providing a second shielding electrode which blocks the line of sight from the compensation electrode to the measurement area on the sample surface.

15. The method according to claim 10, wherein the spectrometer comprises at least two compensation electrodes, wherein the voltages applied to the compensation electrodes are changed to move the position of the maximum electric field caused by the compensation electrodes.

16. The method according to claim 10, comprising the step of providing a correction electrode which is arranged symmetrically around the optical axis, comprising an correction edge arranged between the lens aperture and the sample surface along the optical axis, wherein the correction edge defines an opening allowing electrons to pass the correction electrode, and wherein every point on the edge is at a larger distance from the optical axis than every point on the lens aperture edge.

17. The method according to claim 16, wherein a higher positive voltage is applied on the correction electrode than on the first lens element.

* * * * *